United States Patent
Avasiloaie (10) Patent No.: US 9,227,599 B2
(45) Date of Patent: Jan. 5, 2016

(54) MOUNTING ASSEMBLY FOR WIPER BLADE AND WIPER ARM

(71) Applicant: TRICO PRODUCTS CORPORATION, Rochester Hills, MI (US)

(72) Inventor: Valentin Avasiloaie, Dearborn Heights, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 134 days.

(21) Appl. No.: 13/875,457

(22) Filed: May 2, 2013

(65) Prior Publication Data

US 2014/0325785 A1   Nov. 6, 2014

(51) Int. Cl.
*B60S 1/40* (2006.01)
*B60S 1/38* (2006.01)
*B60S 1/58* (2006.01)
*B60S 1/34* (2006.01)

(52) U.S. Cl.
CPC ............ *B60S 1/4041* (2013.01); *B60S 1/381* (2013.01); *B60S 1/3427* (2013.01); *B60S 1/583* (2013.01); *B60S 2001/4061* (2013.01)

(58) Field of Classification Search
CPC .......... B60S 1/381; B60S 1/387; B60S 1/407; B60S 1/4048; B60S 1/583; B60S 2001/4054
USPC ............................ 15/250.32, 250.351, 250.44
See application file for complete search history.

(56) References Cited

U.S. PATENT DOCUMENTS

| 2,589,339 | A | 3/1952 | Carson |
| 2,616,112 | A | 11/1952 | Smulski |
| 2,643,411 | A | 6/1953 | Nesson |
| 2,799,887 | A | 7/1957 | Nemic |
| 2,801,436 | A | 8/1957 | Scinta |
| 2,814,820 | A | 12/1957 | Elliott et al. |
| 2,932,843 | A | 4/1960 | Zaiger et al. |

(Continued)

FOREIGN PATENT DOCUMENTS

| DE | 1028896 B | 4/1958 |
| DE | 1247161 B | 8/1967 |

(Continued)

OTHER PUBLICATIONS

Sep. 12, 2014 International Search Report and Written Opinion for PCT/US2014/036344.

*Primary Examiner* — Monica Carter
*Assistant Examiner* — Michael Jennings
(74) *Attorney, Agent, or Firm* — Howard & Howard Attorneys PLLC (57) ABSTRACT

A mounting assembly for mounting a wiper blade to a wiper arm includes an adaptor adapted to be mounted to the wiper blade, the adaptor including a base wall and a plurality of side walls extending upwardly from the base wall, and a plurality of hinge pin recesses extending into the side walls adapted to receive a hinge pin of the wiper arm. The mounting assembly also includes a coupler for connection to the wiper arm, the coupler including a top wall, a plurality of side walls depending from the top wall, and a plurality of openings extending into the side walls adapted to receive the hinge pin, and a plurality of arms extending from the side walls and cooperating with the adapter to allow the coupler and the adaptor to be connected together.

14 Claims, 5 Drawing Sheets

(56) References Cited

U.S. PATENT DOCUMENTS

| | | |
|---|---|---|
| 2,937,393 A | 5/1960 | Brueder |
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Biachi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schoen et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 | 6/2006 | Coughlin |
| 7,150,066 B2 | 12/2006 | Huang |
| 7,207,082 B2 | 4/2007 | Lee |
| 7,228,588 B2 | 6/2007 | Kraemer et al. |
| 7,281,294 B2 | 10/2007 | Wllms et al. |
| 7,287,296 B2 | 10/2007 | Vacher |
| 7,451,520 B2 | 11/2008 | Weiler et al. |
| 7,523,522 B2 | 4/2009 | Herring et al. |
| 7,546,660 B2 | 6/2009 | Heinrich et al. |

(56) References Cited

U.S. PATENT DOCUMENTS

| | | | |
|---|---|---|---|
| 7,581,279 B2 | 9/2009 | Baseotto et al. | |
| 7,621,016 B2 | 11/2009 | Verelst et al. | |
| 7,774,892 B2 | 8/2010 | Coughlin | |
| 8,042,218 B2 | 10/2011 | Moll et al. | |
| 8,479,350 B2 * | 7/2013 | Kim et al. | 15/250.32 |
| 8,707,506 B1 * | 4/2014 | Wu | 15/250.32 |
| 2002/0026681 A1 | 3/2002 | Nacamuli | |
| 2003/0159229 A1 | 8/2003 | Weiler et al. | |
| 2004/0019997 A1 | 2/2004 | Baseotto et al. | |
| 2004/0025281 A1 | 2/2004 | Baseotto et al. | |
| 2004/0123414 A1 | 7/2004 | Lee | |
| 2006/0130263 A1 | 6/2006 | Coughlin | |
| 2007/0174989 A1 | 8/2007 | Moll et al. | |
| 2008/0066254 A1 | 3/2008 | Vacher | |
| 2009/0172907 A1 | 7/2009 | Egner-Walter et al. | |
| 2009/0199357 A1 | 8/2009 | Thienard | |
| 2010/0218332 A1 | 9/2010 | Stankiewicz et al. | |
| 2011/0056041 A1 * | 3/2011 | Wu | 15/250.32 |
| 2011/0247166 A1 * | 10/2011 | Depondt et al. | 15/250.32 |
| 2011/0265280 A1 * | 11/2011 | Westermann et al. | 15/250.32 |
| 2012/0060316 A1 * | 3/2012 | Avasiloaie et al. | 15/250.33 |
| 2012/0066857 A1 | 3/2012 | Webert | |
| 2012/0144616 A1 * | 6/2012 | Kim | 15/250.32 |
| 2013/0152326 A1 * | 6/2013 | Oslizlo et al. | 15/250.33 |
| 2013/0167317 A1 * | 7/2013 | Oslizlo et al. | 15/250.32 |
| 2013/0212825 A1 * | 8/2013 | Lee | 15/250.32 |
| 2014/0259504 A1 * | 9/2014 | Piotrowski et al. | 15/250.32 |

FOREIGN PATENT DOCUMENTS

| | | | |
|---|---|---|---|
| DE | 1505397 A1 | 10/1969 | |
| DE | 1655410 A1 | 8/1971 | |
| DE | 2311293 A1 | 9/1974 | |
| DE | 2336271 A1 | 2/1975 | |
| DE | 2350302 A1 | 4/1975 | |
| DE | 2353368 A1 | 5/1975 | |
| DE | 2640399 A1 | 3/1977 | |
| DE | 19729865 A1 | 1/1999 | |
| DE | 19734843 A1 | 2/1999 | |
| DE | 19814609 A1 | 10/1999 | |
| DE | 10335393 A1 | 9/2004 | |
| EP | 0594451 A1 | 4/1994 | |
| FR | 1069875 A | 2/1954 | |
| FR | 2377302 A1 | 8/1978 | |
| FR | 2515121 A1 | 4/1983 | |
| FR | 2896746 A1 * | 8/2007 | B60S 1/40 |
| GB | 878951 A | 10/1961 | |
| GB | 1012902 A | 12/1965 | |
| GB | 1489791 | 4/1975 | |
| GB | 1395918 A | 5/1975 | |
| GB | 2308542 A | 7/1997 | |
| JP | 2007-331748 A | 12/2007 | |
| WO | 0021809 A1 | 4/2000 | |
| WO | 02087935 A1 | 11/2002 | |
| WO | 03051696 A1 | 6/2003 | |
| WO | 03080409 A1 | 10/2003 | |
| WO | 2004048163 A1 | 6/2004 | |
| WO | 2004076251 A1 | 9/2004 | |
| WO | 2004076252 A1 | 9/2004 | |
| WO | 2006069648 A1 | 7/2006 | |
| WO | 2008/052961 A1 | 5/2008 | |
| WO | 2009133979 A1 | 11/2009 | |
| WO | 2011131395 A2 | 10/2011 | |
| WO | 2012/037227 A2 | 3/2012 | |

* cited by examiner

MOUNTING ASSEMBLY FOR WIPER BLADE AND WIPER ARM

BACKGROUND OF THE INVENTION

1. Field of the Invention

The present invention relates generally to wiper systems for vehicles and, more specifically, to a mounting assembly for mounting a wiper blade to a wiper arm for a wiper system of a vehicle.

2. Description of the Related Art

Conventional wiper systems known in the related art include some type of wiper assembly (hereinafter referred to as a "wiper blade") mounted to a wiper arm assembly (hereinafter referred to as a "wiper arm"), which, in turn, is mounted adjacent to a surface to be wiped, such as a windshield. The wiper arm is pivotally driven to impart reciprocal motion to the wiper blade across the windshield. The wiper blade includes a wiping element that contacts the windshield across the surface to be wiped. The wiper blade is commonly either of the "tournament" or "beam blade" type. Both types of wiper blades commonly known in the related art typically incorporate one or more metal strips that act to reinforce the wiping element and facilitate wiping contact by the wiping element across what is typically a curved surface. In this context, the wiper arm delivers downward force to the wiper blade that is distributed thereacross, pressing the wiping element into contact with the surface to be wiped.

While such wiper systems known in the related art have generally worked for their intended purposes, some deficiencies still remain. In a rear wiper blade application, one type of wiper blade is mounted to one type of wiper arm. This requires many different types of wiper blades for many different vehicles. As such, there are multiple wiper blades for each vehicle model, which is undesired.

Thus, there remains a need in the art for one wiper blade to fit multiple vehicles. There is also a need in the art for a mounting assembly to allow replacement of rear blades on various vehicles.

SUMMARY OF THE INVENTION

The present invention overcomes many limitations and disadvantages in the related art in a mounting assembly for mounting a wiper blade to a wiper arm. The mounting assembly includes an adaptor adapted to be mounted to the wiper blade. The adaptor includes a base wall and a plurality of side walls extending upwardly from the base wall, and a plurality of hinge pin recesses extending into the side walls adapted to receive a hinge pin of the wiper arm. The mounting assembly also includes a coupler for connection to the wiper arm. The coupler includes a top wall, a plurality of side walls depending from the top wall, and a plurality of openings extending into the side walls adapted to receive the hinge pin, and a plurality of arms extending from the side walls and cooperating with the adapter to allow the coupler and the adaptor to be connected together.

In this way, the mounting assembly of the present invention is used in rear blade applications to allow the same type of wiper blade to be used on various vehicles using different adaptors. The mounting assembly of the present invention combines a connector or coupler feature with an adaptor feature, allowing the same wiper blade to be used in multiple applications using different couplers. The mounting assembly of the present invention provides for one wiper blade to fit multiple vehicles. In addition, the mounting assembly of the present invention incorporates a secondary locking mechanism if the coupler fails in service.

Other objects, features, and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
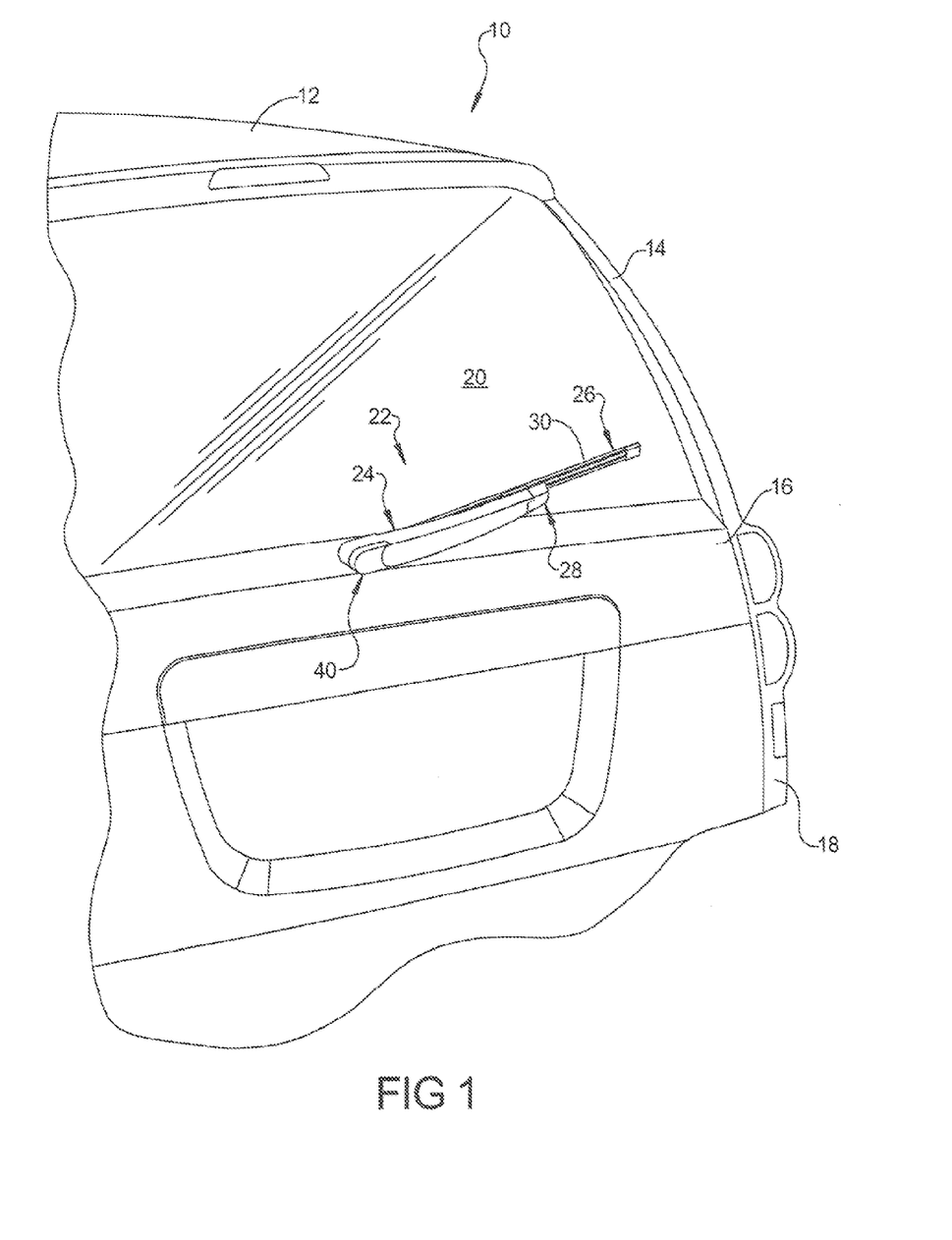
FIG. 1 is a partial perspective view of a rear of a vehicle having a wiper system incorporating a mounting assembly according to the present invention.

Referring now to the figures, where like numerals are used to designate like structure, a portion of a vehicle is schematically illustrated at 10 in FIG. 1. More specifically, the portion of the vehicle 10 that has been employed to illustrate the present invention includes a generic illustration of a rear of a vehicle. Thus, the vehicle 10 includes a roof 12, a pair of pillars 14 (only one of which is shown in FIG. 1), a lift gate 16, and a rear 18 of the vehicle 10. A glass rear window 20 extends between the pillars 14 on the lift gate 16. While the rear of the vehicle 10 illustrated herein employs a lift gate 16, those having ordinary skill in the art will appreciate from the description that follows that the vehicle 10 could include a hatch back or any other commonly known configuration without departing from the scope of the present invention.

A wiper system is generally shown at 22 in FIG. 1 and in the embodiment illustrated herein, is employed to clean the rear window 20. The wiper system 22 includes a wiper arm assembly, generally indicated at 24, thereinafter referred to as a "wiper arm"), and a wiper assembly, generally indicated at 26, (hereinafter referred to as a "wiper blade"). In the embodiment illustrated herein, the wiper arm 24 is operatively mounted to the lift gate 16 and is moveable in an oscillating fashion to move the wiper blade 26 across the rear window 20. The wiper blade 26 is releasably engaged to the wiper arm 24 via a mounting assembly, according to the present invention and generally indicated at 28, that operatively interconnects the wiper blade 26 and wiper arm 24. The wiper blade 26 is adapted to clean the surface to be wiped, in this case, the rear window 20. It should be appreciated by those having ordinary skill in the art that the wiper system 22 may include other components besides the wiper arm 24 and wiper blade 26. Furthermore, it should be appreciated by those having ordinary skill in the art that the wiper arm 24 and wiper blade 26 may be employed in other areas of the vehicle 10, such as a front windshield (not shown) or a head lamp (not shown) that employs a wiper system. Thus, it will be understood that the present invention is not limited for use solely in connection with wiper arms 24 adjacent to a vehicle's rear window 20, but for use in all applications where wiper blades 26 are employed.

Figure 2:
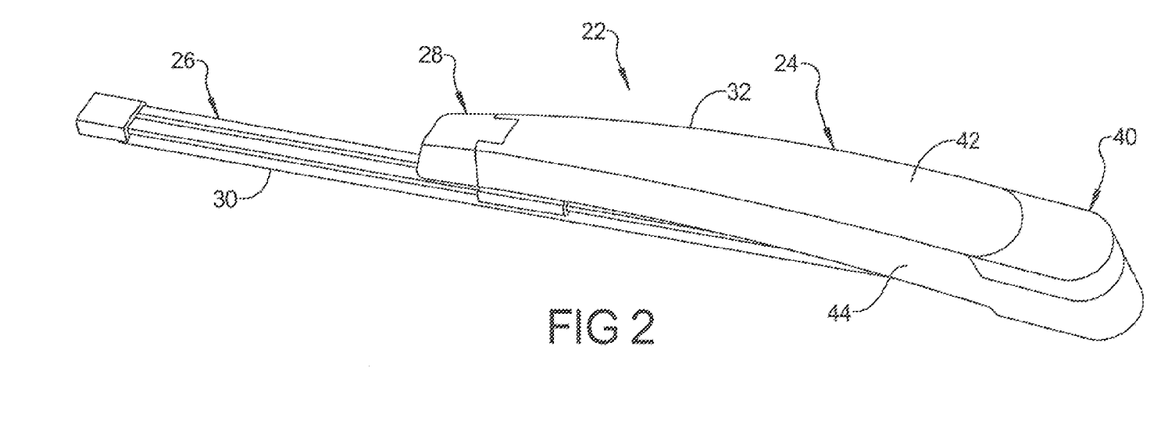
FIG. 2 is a perspective view of a portion of the wiper system incorporating the mounting assembly of the present invention of FIG. 1.

Referring to FIGS. 1 and 2, the wiper blade 26 includes a wiping element 30 that has a predetermined length and cross-sectional profile corresponding to a particular application and is typically manufactured through an extrusion process, which enables the length and cross-sectional profile of the wiping element 30 to be easily adjusted without a substantial increase to manufacturing expense. Furthermore, the wiping element 30 is constructed from a flexible rubber. It should be appreciated by those having ordinary skill in the art that the wiping element 30 may be constructed from any flexible material, such as silicone or other polymer, and via any manufacturing process, such as injecting molding, without departing from the scope of the present invention.

Those having ordinary skill in the art will also appreciate that the wiper blade 26 may be of either the tournament or beam blade type having any standard construction as is commonly known in the art. Thus, whether the wiper blade 26 is a tournament or beam style blade, it will generally distribute downward pressure from the wiper arm 24 across the wiping element 30. Moreover, the wiper blade 26 may be curved longitudinally with a predetermined radius of curvature that is the same or greater than the plane of curvature of the rear window 20, if any. This predetermined radius of curvature is sometimes referred to in the related art as a "free form" radius of curvature (hereinafter "windshield curvature"). Accordingly, the curvature of the wiper blade 26 may be symmetrical or asymmetrical depending on the three requirements and the contour of the surface to be wiped. The flexible, free form, pre-curved wiper blade 26 straightens out when the wiper arm 24 applies a force thereto to flatten it and direct the wiping element 30 to contact the surface to be wiped. Thus, the wiper blade 26 may include a free-form curvature that ensures force distribution on rear windows 20 or windshields having various curvatures that effects proper wrapping about the surface to be wiped. The wiper blade 26 may also include an airfoil (not shown) to reduce the likelihood of wind lift during operational movement across the surface to be wiped. However, it should be appreciated by those having ordinary skill in the art that the airfoil is optional, especially where the wiper blade 26 is employed on the rear window 20.

Figure 3:
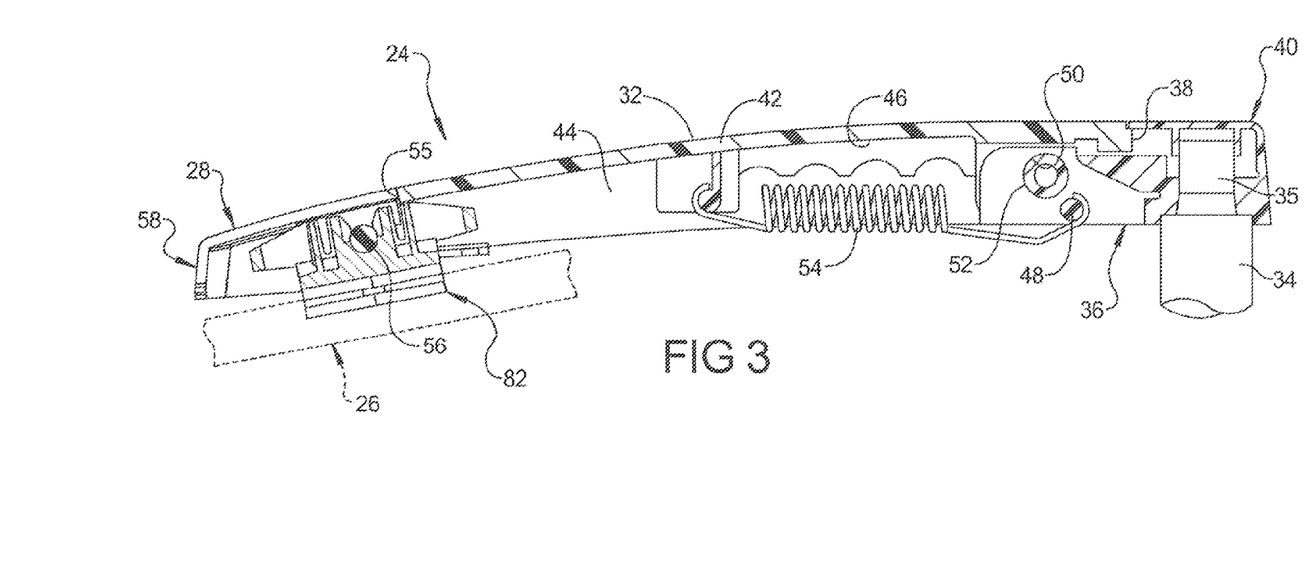
FIG. 3 is a cross-sectional side view of the portion of the wiper system incorporating the mounting assembly of the present invention of FIG. 2.

Referring to FIGS. 1 through 3, the wiper arm 24 includes an elongated body 32 operatively mounted to a pivot shaft 34, which, in turn, is driven by an electrical motor (not shown) either directly or through appropriate linkages as is commonly known in the art. To this end, the wiper arm 24 includes a head, generally indicated at 36, that is supported on the body 32 and adapted to be mounted to the pivot shaft 34 and drives the wiper blade 26 in an oscillating manner across the surface to be wiped. The head 36 is operatively mounted to the pivot shaft 34 via a nut 35 threaded onto the distal end of the pivot shaft 34 or via any suitable fastener known in the related art. The wiper arm 24 includes an opening 38 in the body 32 that provides access to the head 36 and to the pivot shaft 34. The wiper arm 24 also includes a cover, generally indicated at 40, mounted to the body 32 at the opening 30 and is movable from a first position closing the opening 38 to a second position allowing access to the head 36 and the pivot shaft 34 via the opening 38.

As illustrated in FIGS. 2 and 3, the body 32 has a top wall 42 and side walls 44 depending from the top wall 42 so as to define an inversely open ended U-shape with an interior cavity 46. The head 36 is operatively supported by the body 32 in the interior cavity 46. To this end, the body 32 may include a pair of opposed bosses 48 formed on the interior cavity 46 opposite one another and that present a pair of inwardly facing openings 50. The head 36 may employ a pair of bearings 52 that are cooperatively received in the inwardly facing openings 50 such that the head 36 and body 32 may pivot relative to each other about an axis defined by the bearings 52. The wiper arm 24 may include a biasing member 54, such as a coiled spring, disposed in the interior cavity 46 of the body 32 and operatively connected between the head 36 and the body 32 as is commonly known in the art. It should be appreciated that the biasing member 54 generates a downward force on the wiper blade 26 as it oscillates across the surface to be wiped.

The inwardly facing openings 50 open in a direction that is below an imaginary horizontal line extending through the center of the hearings 52. The bearings 52 are disposed in sliding engagement with the opposed bosses 48. The downwardly angled inwardly facing openings 50 of the bearings 48 essentially capture the head 36 during assembly under the force provided by the biasing member 54. At the same time, this interaction allows rotation between the body 32 and the head 36. Moreover, the interaction of the bosses 48 with the hearings 52 functions as a bearingless joint between the body 32 and the head 36. Thus, the biasing member 54 retains the body 32 relative to the head 36 during use without the need of a rivet. The top wall 42 and sidewalls 44 of the body 32 essentially envelopes the arm/head joint from both sides as well as from the top. This arrangement offers protection from snow and ice buildup that commonly causes conventional wiper arms to freeze during wintery weather conditions causing loss of arm load resulting in poor wipe quality. The internal joint formed between the opposed bosses 48 and the hearings 52 also offer superior serviceability by allowing the body 32 to be rotated about the axes defined between the bosses 48 and bearings 52 while maintaining excellent lateral strength. In addition, the operative interaction between the head 36 and body 32 requires no tools or fastening mechanisms and all components can be assembled by hand. Thus, the operation of the body 32 relative to the head 36 effectively lowers the cost of the joint formed therebetween.

Figure 7:
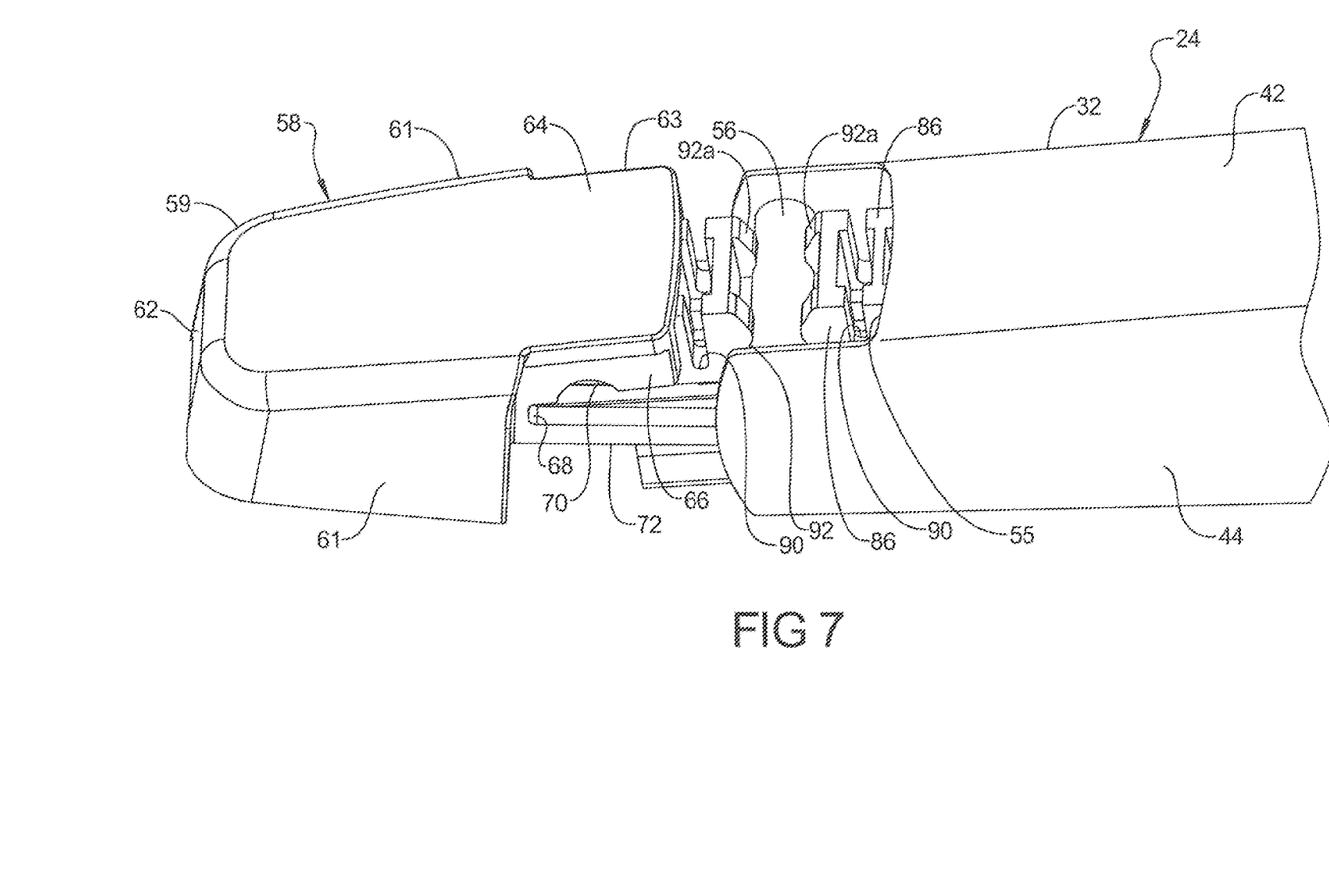
FIG. 7 is a perspective view of the mounting assembly of the present invention of FIG. 3 partially mounted to a wiper arm of the wiper system of FIG. 1.

As illustrated in FIGS. 3 and 7, the body 32 of the wiper arm 24 has a recess 55 extending axially into the top wall 42 at the end opposite the head 36. The recess 55 is generally rectangular in shape. The body 32 also includes a hinge pin 56 extending laterally between the side walls 44 below the recess 55. The hinge pin 56 is generally cylindrical and circular in cross-sectional shape. The body 32 further includes a flange or ledge wall 57 extending laterally inwardly from each of the side walls 44 below the recess 55 and hinge pin 56. It should be appreciated that the mounting assembly 28 is mounted to body 32 of the wiper arm 24 at the end opposite the head 36.

Figure 4:
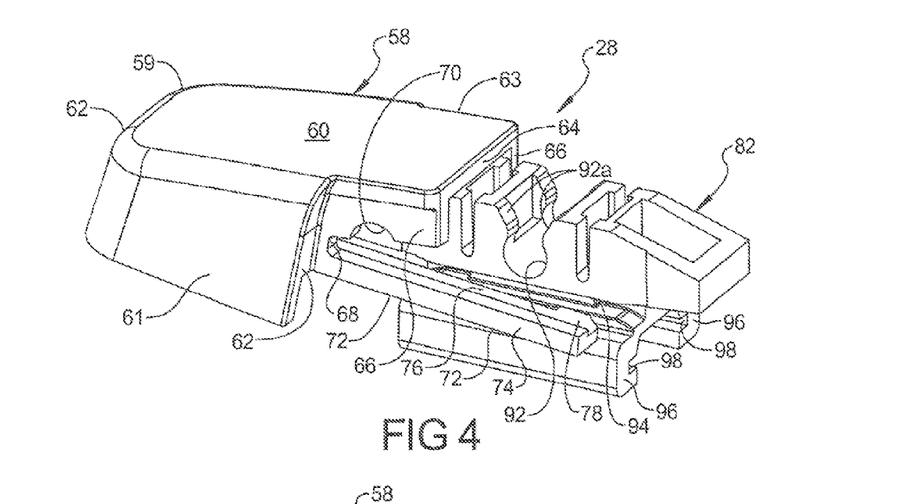
FIG. 4 is a perspective view of one embodiment of the mounting assembly of the present invention of FIG. 2.
Figure 5:
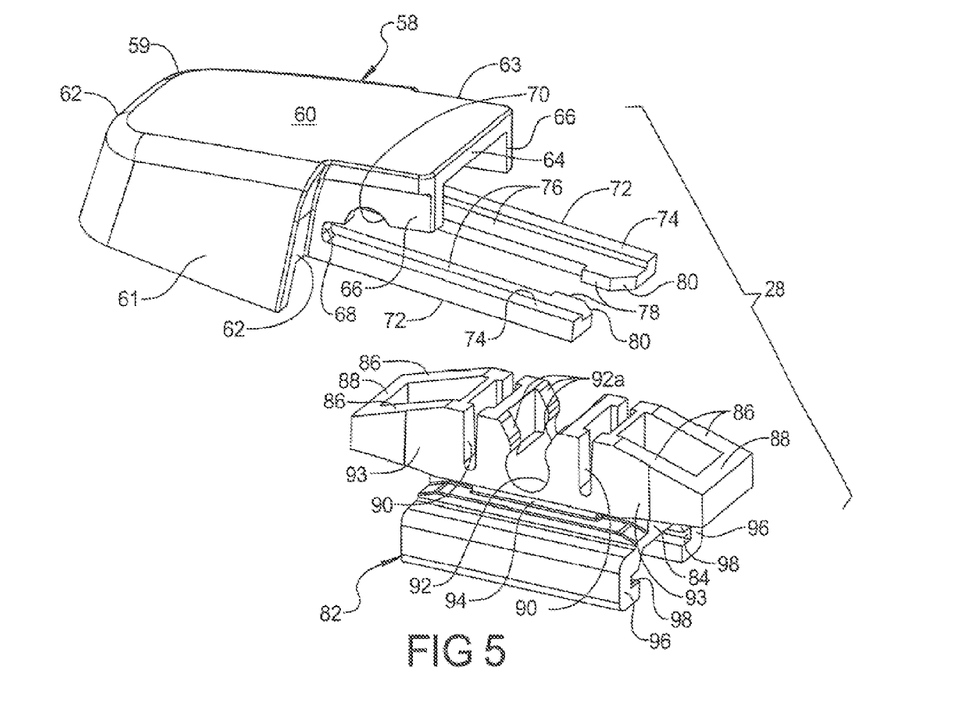
FIG. 5 is an exploded perspective view of the mounting assembly of the present invention of FIG. 4.

Referring now to FIGS. 4 and 5, one embodiment of the mounting assembly 28 is shown. The mounting assembly 28 includes a coupler, generally indicated at 58, for connection to the body 32 of the wiper arm 24. The coupler 58 includes an end portion 59 having a top wall 60, side walls 61, and end walls 62 depending therefrom. The coupler 58 also includes an extension portion 63 extending axially from one of the end walls 62 and having a top wall 64 and side walls 66 depending therefrom. The extension portion 63 includes present a pair of openings 68 extending axially into the side walls 66. The openings 68 have a recess 70 extending upwardly into the side walls 66. It should be appreciated that the top wall 64 of the extension portion 63 is adapted to be disposed in the recess 55 of the body 32 of the wiper arm 24 when the mounting assembly 28 is mounted to the wiper arm 24.

The extension portion 63 includes a plurality of elongated arms 72 extending from the side walls 66. Each of the elongated arms 72 has a first wall 74 extending axially and vertically and a second wall 76 extending axially and horizontally to form a general "L" shape. Each of the elongated arms 72 have a projection 78 extending horizontally from the second wall 76 at a free end thereof. Each of the elongated arms 72 have a chamfer 80 at the free end thereof to allow easier insertion. It should be appreciated that the elongated arms 72 are supported by the ledge walls 57 extending laterally inwardly from each of the side walls 44 of the body 32 when the mounting assembly 28 is mounted to the wiper arm 24.

Referring to FIGS. 3 through 7, the mounting assembly 28 also includes an adaptor, generally indicated at 82, that cooperates with the coupler 58. The adaptor 82 includes a base wall 84 and a pair of side walls 86 and end walls 88 extending upwardly from the base wall 84. The side walls 86 are angled downwardly toward the base wall 84. It should be appreciated that the angle on the side walls 86 allow the adaptor 82 to pivot relative to the body 32 of the wiper arm 24 when the mounting assembly 28 is mounted to the wiper arm 24.

The adaptor 82 also includes one or more slots 90 extending downwardly into the side walls 86 and a hinge pin recess 92 extending downwardly into each of opposed side walls 86 between the slots 90. The hinge pin recess 92 has a generally inverted "key hole" shape with a circular portion shape at a bottom thereof. The adaptor 82 includes one or more raised portions 93 extending outwardly from the side walls 86. It should be appreciated that the slots 90 allow the side walls 86 to flex when the hinge pin 56 of the body 32 abuts axially extending portions 92 on the hinge pin recess 92 when the hinge pin 56 is disposed in the hinge pin recess 92 of the adaptor 82.

Figure 6:
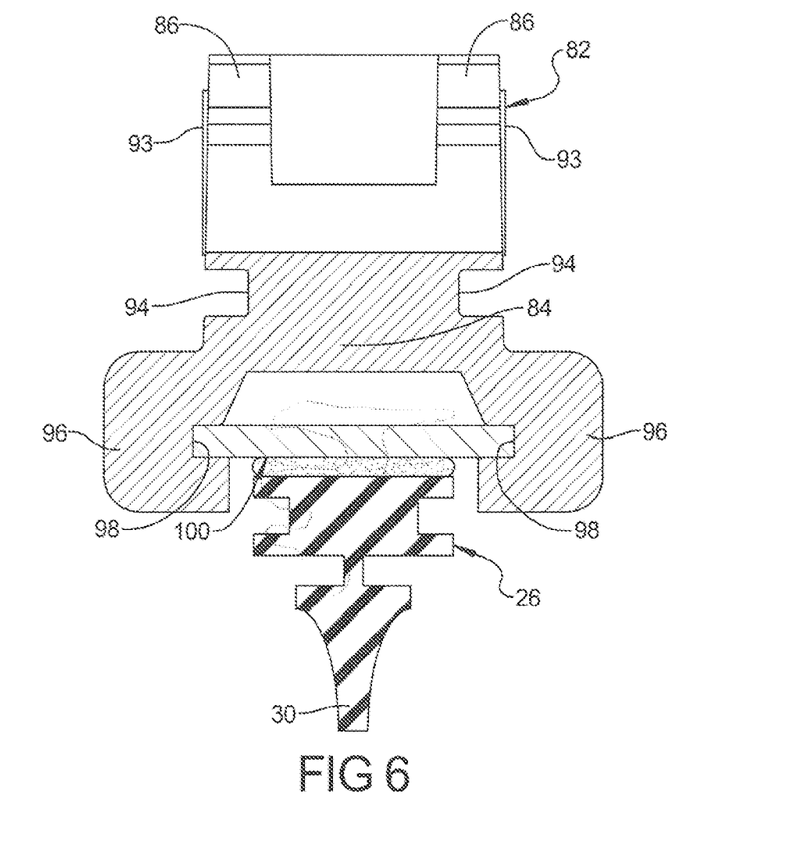
FIG. 6 is a sectional view of the mounting assembly of the present invention of FIG. 3.

The adaptor 82 also includes a pair of opposed grooves 94 extending inwardly and longitudinally. The adaptor 82 further includes a plurality of channel walls 96 extending downwardly from the base wall 84 and forming grooves 98 to receive a support structure such as a beam 100 of the wiper blade 26 as illustrated in FIG. 6. The channel walls 96 are generally "C" shaped in cross-section and extend longitudinally. The adaptor 82 is a made of a material such as plastic. The adaptor 82 is integral, unitary, and one-piece.

In its operative mode, the mounting assembly 28 has its adaptor 82 secured to the wiper blade 26 such that the beam 100 disposed in the grooves 98 of the channel walls 96. The hinge pin 56 of the body 32 is disposed in the hinge pin recess 92 of the adaptor 82 such that the adaptor 82 is snapped or locked onto the hinge pin 56. The coupler 58 is slid onto the adaptor 82 such that the elongated arms 72 are flexed outwardly by the projections 78 as the projections 78 slide along the groove 94 until the projections 78 are disposed past the grooves 94 and the elongated arms 72 are flexed inwardly to create a secondary locking mechanism for the coupler 58. In this position, the recesses 70 are disposed over the hinge pin 56 of the body 32 and the extension portion 63 is disposed in the end of the cavity 46 of the body 32 of the wiper arm 24 and the top wall 64 of the extension portion 63 is disposed in the recess 55 of the body 32 and the elongated arms 72 are supported by the ledge walls 57 of the body 32 of the wiper arm 24.

For releasable engagement of the mounting assembly 28 with the wiper arm 24, the end portion 59 of the coupler 56 is moved axially away from the body 32 of the wiper arm 24. A tool (not shown) is used to lift the top wall 64 of the extension portion 63 and move it axially away from the body 32 such that the recesses 70 disengage the hinge pin 56 and expose the hinge pin 56. The adaptor 82 is moved downwardly to disengage the hinge pin 56 of the body 32 from the hinge pin recess 92, thereby releasing the mounting assembly 28 from the wiper arm 24. The mounting assembly 28 can have the coupler 58 moved away from the adaptor 82 such that the elongated arms 72 are flexed outwardly and the projections 78 slide along the groove 94 until the projections 78 are disposed past the grooves 94. The adaptor 82 is then unsecured from the wiper blade 26 by removing the beam 100 of the wiper blade 26 from the grooves 98 of the adaptor 82.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A mounting assembly for mounting a wiper blade to a wiper arm, said mounting assembly comprising:
    an adaptor adapted to be mounted to the wiper blade, said adaptor including a base wall and a plurality of side walls extending upwardly from said base wall, and a plurality of hinge pin recesses extending into said side walls adapted to receive a hinge pin of the wiper arm; and
    a coupler for connection to the wiper arm, said coupler including an end portion and an extension portion adapted to be received within the wiper arm, said end portion including a top wall and a plurality of side walls and a plurality of end walls depending therefrom; and wherein said extensions portion is continuous with said top wall of said end portion and extends axially from one of said end walls of said end portion and respectively has a top wall, a plurality of side walls depending from said top wall, and a plurality of openings extending into said side walls adapted to receive the hinge pin, and a plurality of arms extending from said side walls and cooperating with said adapter to allow said coupler and said adaptor to be connected together.

2. A mounting assembly as set forth in claim 1 wherein said adaptor includes a plurality of channel walls extending from said base wall and forming a plurality of grooves adapted to receive a support structure of the wiper blade.

3. A mounting assembly as set forth in claim 1 wherein said adaptor includes a plurality of slots extending downwardly into said side walls.

4. A mounting assembly as set forth in claim 3 wherein one of said hinge pin recesses extends downwardly into each of opposed side walls between said slots.

5. A mounting assembly as set forth in claim 1 wherein said adaptor includes one or more raised portions extending outwardly from said side walls.

6. A mounting assembly as set forth in claim 1 wherein said adaptor includes a pair of opposed grooves extending inwardly and axially into said base wall to receive said elongated arms of said coupler.

7. A mounting assembly as set forth in claim 1 wherein each of said openings have a recess extending upwardly into said side walls of said extension portion of said coupler.

8. A mounting assembly as set forth in claim 1 wherein each of said elongated arms has a first wall extending axially and vertically and a second wall extending axially and horizontally from said first wall.

9. A mounting assembly as set forth in claim 8 wherein each of said elongated arms has a projection extending horizontally from said second wall at a free end thereof.

10. A wiper system for a vehicle comprising:

a wiper blade adapted to contact a surface to be wiped, a wiper arm adapted to support said wiper blade as it moves across a surface to be wiped and having a hinge pin, and a mounting assembly that operatively interconnects said wiper blade and said wiper arm; and said mounting assembly including an adaptor mounted to said wiper blade, said adaptor including a base wall and a plurality of side walls extending upwardly from said base wall, and a plurality of hinge pin recesses extending into said side walls to receive said hinge pin of said wiper arm and a coupler connected to said wiper arm, said coupler including an end portion and an extension portion is continuous with said top wall of said end portion and adapted to be received within said wiper arm, wherein said extension portion has a top wall, a plurality of side walls depending from said top wall, and a plurality of openings extending into said side walls to receive said hinge pin, and a plurality of arms extending from said side walls and cooperating with said adapter to allow said coupler and said adaptor to be connected together, and wherein each of said openings have a recess extending upwardly into said side walls of said extension portion of said coupler.

11. A wiper system as set forth in claim 10 wherein said adaptor includes a plurality of channel walls extending from said base wall and forming a plurality of grooves adapted to receive a support structure of the wiper blade.

12. A wiper system as set forth in claim 10 wherein said adaptor includes a pair of opposed grooves extending inwardly and axially into said base wall to receive said elongated arms of said coupler.

13. A wiper system as set forth in claim 10 wherein each of said elongated arms includes a first wall extending axially and vertically from one of said side walls and a second wall extending axially and horizontally from said first wall, and as projection extending horizontally from said second wall at a free end thereof.

14. A wiper system for a vehicle comprising:

a wiper blade having a support structure and a wiping element supported by said support structure to contact a surface to be wiped, a wiper arm to support said wiper blade as it moves across a surface to be wiped, and a mounting assembly that operatively interconnects said wiper blade and said wiper arm;

said mounting assembly including an adaptor mounted to said wiper blade, said adaptor including a base wall and a plurality of side walls extending upwardly from said base wall, and a plurality of hinge pin recesses extending into said side walls to receive a hinge pin of said wiper arm and a coupler connected to said wiper arm, said coupler including an end portion and an extension portion is continuous with said top wall of said end portion and adapted to be received within said wiper arm, wherein said extension portion has a top wall to be received within a recess of said wiper arm, a plurality of side walls depending from said top wall, and a plurality of openings extending into said side walls to receive said hinge pin, and a plurality of arms extending from said side walls and cooperating with said adapter to allow said coupler and said adaptor to be connected together;

wherein said adaptor includes a plurality of generally "C" shaped channel walls extending from said base wall and forming a plurality of grooves to receive a portion of said support structure of said wiper blade; and wherein each of said elongated arms includes a first wall extending axially and vertically from one of said side walls and a second wall extending axially and horizontally from said first wall, and a projection extending horizontally from said second wall at a free end thereof.

\* \* \* \* \*